United States Patent
Brehm et al.

(10) Patent No.: US 9,976,880 B2
(45) Date of Patent: May 22, 2018

(54) SENSOR FIBER HAVING A MULTICORE OPTICAL WAVEGUIDE INCLUDING FIBER BRAGG GRATINGS

(71) Applicant: j-fiber, GmbH, Jena (DE)

(72) Inventors: Lothar Brehm, Jena (DE); Jurgen Rosenkranz, Jena (DE); Otto Bernauer, Jena (DE); Ralitsa Rosenow, Jena (DE); Armin Landers, Jena (DE); Katrin Roessner, Jena (DE); Robert Hanf, Jena (DE)

(73) Assignee: S-fiber, GmbH, Jena (DE)

( * ) Notice: Subject to any disclaimer, the term of this patent is extended or adjusted under 35 U.S.C. 154(b) by 0 days. days.

(21) Appl. No.: 13/952,009

(22) Filed: Jul. 26, 2013

(65) Prior Publication Data

US 2014/0029889 A1 Jan. 30, 2014

(51) Int. Cl.
| | |
|---|---|
| *G02B 6/34* | (2006.01) |
| *G01D 11/00* | (2006.01) |
| *G01B 11/16* | (2006.01) |
| *G01L 1/24* | (2006.01) |
| *G01L 3/12* | (2006.01) |
| *G01K 11/32* | (2006.01) |
| *G01D 5/353* | (2006.01) |
| *G02B 6/02* | (2006.01) |

(52) U.S. Cl.
CPC ............... *G01D 11/00* (2013.01); *G01B 11/18* (2013.01); *G01D 5/3538* (2013.01); *G01D 5/35312* (2013.01); *G01K 11/3206* (2013.01); *G01L 1/246* (2013.01); *G01L 3/12* (2013.01); *G02B 6/34* (2013.01); *G02B 6/02042* (2013.01); *G02B 6/02076* (2013.01)

(58) Field of Classification Search
CPC .. G01L 1/246; G02B 6/02042; G02B 6/02076
See application file for complete search history.

(56) References Cited

U.S. PATENT DOCUMENTS

| | | | |
|---|---|---|---|
| 5,144,690 A | 9/1992 | Domash | |
| 5,557,400 A * | 9/1996 | Sorin | G01B 11/16 250/227.19 |
| 5,563,967 A * | 10/1996 | Haake | 385/12 |
| 5,734,773 A | 3/1998 | Teshima et al. | |
| 6,301,420 B1 * | 10/2001 | Greenaway et al. | 385/126 |
| 7,027,699 B2 * | 4/2006 | Tao et al. | 385/126 |
| 7,317,849 B1 | 1/2008 | Meneghini et al. | |
| 7,379,631 B2 * | 5/2008 | Poland et al. | 385/12 |
| 7,720,322 B2 * | 5/2010 | Prisco | 385/12 |
| 7,772,541 B2 * | 8/2010 | Froggatt et al. | 250/227.23 |
| 8,041,173 B2 * | 10/2011 | Imamura | 385/126 |

(Continued)

FOREIGN PATENT DOCUMENTS

WO WO2007/143368 A2 12/2007

*Primary Examiner* — Thomas A Hollweg
*Assistant Examiner* — Mary A El Shammaa
(74) *Attorney, Agent, or Firm* — Kuta IP Law LLC; Christine M. Kuta

(57) ABSTRACT

A sensor fiber for the detection of changes of temperature, bending, and/or torsion includes a multicore optical waveguide with a fiber Bragg grating (FBG) structure. One embodiment contains at least two FBG cores and a surrounding cladding. The sensor fiber is characterized by one or more distinction and orientation means which produce a marker zone to assign and label each individual FBG core.

2 Claims, 4 Drawing Sheets

(56) References Cited

U.S. PATENT DOCUMENTS

| | | | |
|---|---|---|---|
| 8,123,400 B2* | 2/2012 | Andrejco et al. | 374/131 |
| 8,746,076 B2* | 6/2014 | Rogge et al. | 73/800 |
| 8,818,143 B2* | 8/2014 | Younge et al. | 385/13 |
| 2002/0146226 A1* | 10/2002 | Davis | G02B 6/02042 385/126 |
| 2004/0258376 A1 | 12/2004 | Fokine et al. | |
| 2005/0232538 A1* | 10/2005 | Martinez | G02B 6/12007 385/24 |
| 2007/0041083 A1* | 2/2007 | Di Teodoro | G02B 6/02347 359/333 |
| 2007/0104431 A1* | 5/2007 | Di Teodoro | G02B 6/02347 385/123 |
| 2007/0146843 A1* | 6/2007 | Mitasaki | G11B 7/0065 359/22 |
| 2007/0297711 A1* | 12/2007 | Childers et al. | 385/12 |
| 2008/0212082 A1* | 9/2008 | Froggatt | G01M 11/083 356/73.1 |
| 2009/0137952 A1* | 5/2009 | Ramamurthy | A61B 5/06 604/95.01 |
| 2009/0185772 A1* | 7/2009 | Xia | A61B 5/0059 385/13 |
| 2009/0314925 A1* | 12/2009 | Van Vorhis | A61B 19/5244 250/203.2 |
| 2011/0109898 A1* | 5/2011 | Froggatt et al. | 356/73.1 |
| 2011/0319714 A1* | 12/2011 | Roelle et al. | 600/118 |
| 2015/0268117 A1* | 9/2015 | Challener | G01D 5/35312 356/33 |

\* cited by examiner

SENSOR FIBER HAVING A MULTICORE OPTICAL WAVEGUIDE INCLUDING FIBER BRAGG GRATINGS

BACKGROUND

An optical fiber including fiber Bragg gratings can be used as a sensor fiber to detect temperature, strain and/or torsion. Such sensor fibers are used to control materials and processes. By inscribing fiber Bragg gratings (FBG) in the fiber core, a sensitivity with respect to changes in temperature and/or length is achieved. By a combination of some fibers of this kind, it is possible to detect bending and tension of materials. To reduce environmental effects, single FBG are included in one fiber which contains more FBG.

Information relevant to producing multi core fibers can be found in U.S. Pat. No. 5,563,967. This patent discloses a method for the production of a sensor fiber with two FBG cores. Such sensor fibers allow for the simultaneous detection of temperature and length changes.

The sensor fibers known in conventional art bear the disadvantage that it is not possible without further processing to detect changes of length, bending, temperature and torsion. For the accumulation of extensive measurement data, many FBG are necessary and the analysis of the accumulated raw data grows more and more complex.

For the foregoing reasons, there is a need for sensor fibers able to sense with fewer FBG.

SUMMARY

The present inventions are directed to a sensor fiber with a simple construct allowing the measurement of many parameters including temperature, length, bending and particularly torsion changes simultaneously.

This is achieved by a sensor fiber with multiple cores in a FBG structure. The sensor fiber contains at least two FBG fiber cores and a surrounding cladding and is characterized in that one or more means for the discrimination and orientation are arranged in the fiber so that each FBG fiber core can be addressed explicitly.

In a first embodiment, the sensor fiber has a multicore optical waveguide. The multicore optical waveguide includes a fiber Bragg grating structure with at least two fiber Bragg grating cores and a cladding material surrounding the at least two fiber Bragg grating cores. The fiber Bragg grating structure is configured and arranged such that a detectable marker zone is formed in the sensor fiber. The detectable marker zone enables a measurement system to detect the orientation of the fiber and the cores.

A benefit of the present inventions is that the structure of the single FBG cores. means that an individual sensor fiber is capable of being discriminated. So, the measurement signal from each individual FBG core can be detected individually and assigned to the particular fiber core. By these means for discrimination and orientation, it is possible to detect, in addition to changes of length, bending and strain, temperature and the torsion acting on the fiber. Torsion can be measured due to the discrimination and orientation means. The discrimination and orientation means address the individual FBG cores so that the measurement setup is able to attribute parts of the measurement signal to the location of the fiber core.

In a first embodiment the orientation and discrimination means are a non-cylindrical symmetric placement of the single FBG cores within the cladding whereas the number of FBG cores is selected in order to enable explicit labeling.

The single FBG cores are allocated over the cross section of the fiber so that their asymmetric placement yields an explicit discrimination of the FBG cores.

In another embodiment the mean of discrimination and orientation is includes marker zones within the cladding. In this case, the sensor fiber has at least one reference point or signal which can be read out by the measurement setup to discriminate the individual FBG cores.

These marker zones have several different configurations.

In one embodiment the marker zone is a capillary embedded in the cladding. This is characterized by a hole structure which can be easily optically detected. This hole structure results in a reference point within the fiber cross section making the FBG cores discriminable.

In another embodiment this capillary is filled with an analyte or marker. Therefore, additional measurement signals can be obtained and/or the detection of the reference point can be enhanced.

In a further embodiment, the marker zone is built with a rod inducing mechanical tension. This tension results in a detectable change of the optical properties of the waveguides in proximity, which allows a labelling of particular cores.

The discrimination according to this embodiment is achieved in that at least one FBG core shows an optically different behaviour and can be used as reference. From this reference the other FBG cores can be addressed.

In another embodiment, the marker zone is built with a rod within the cladding which is made of the cladding material and therefore not able to guide light.

The discrimination of the individual FBG cores is achieved by a measurement system which is calibrated for a symmetric alignment. This alignment is disturbed by the rod made of cladding material. This discontinuity is used as reference point which allows the labeling of the FBG cores.

In another embodiment, the marker zone is built with an unsymmetrical ground FBG core. The optical properties of this FBG core are modified and therefore a reference point is generated. From this reference point, the other FBG cores can be addressed within the sensor fiber.

In addition each FBG core can be surrounded by a layer having reduced refractive index to reduce the optical crosstalk between adjacent FBG cores. This results in an optimized quality of the measurement signal.

The present invention together with the above and other advantages may best be understood from the following detailed description of the embodiments of the inventions illustrated in the drawings, wherein similar elements are similarly labeled, wherein:

DRAWINGS

DESCRIPTION

Embodiments of the present inventions having multiple FBG cores are produced by the merging of doped and/or undoped glass rods. These embodiments contain either single-mode or multi-mode preforms. Furthermore doped or undoped glass rods can be included as place holders or to induce mechanical tension. These single cores are arranged within a tube so that a discrimination of the individual cores is possible after melting and drawing the fiber. Some exemplary embodiments are described below.

The sizes of the cross-section of the marker zones are merely exemplary and variation in their sizes is within the scope of the inventions. It is adequate if the marker zones are sized for a reliable detection. Therefore it is adequate if the marker zone can be detected as hole or inhomogeneity.

Figure 1:
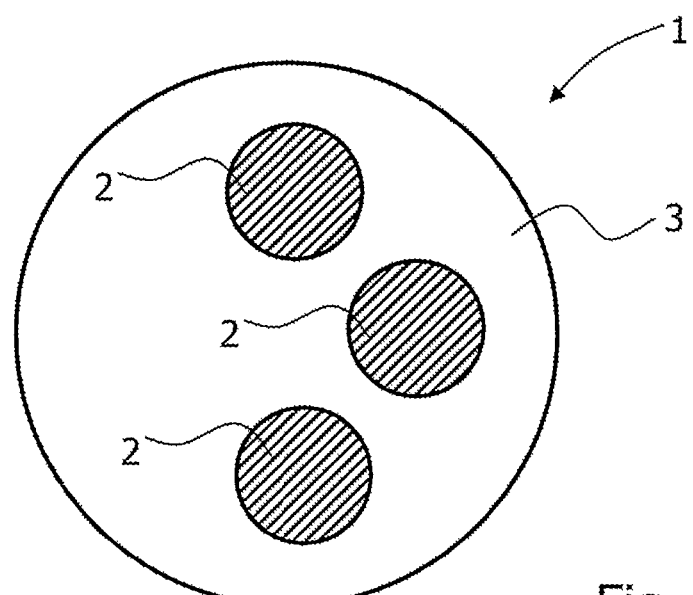
FIG. 1 is a cross-section of a first embodiment of the sensor fiber according to principles of the inventions.

FIG. 1 shows the cross-section of a first embodiment. This example contains a sensor fiber 1 including three single FBG cores 2. These three cores are surrounded by a cladding 3, also referred to as a "cladding material". The sensor fiber shown here has a circular cross-section. Other cross-sections of the sensor fiber, e. g. elliptical shapes, are also possible.

The embodiment shown in FIG. 1 has three FBG-cores in an asymmetric arrangement. This arrangement can also be described as non-cylindrical. The discrimination and orientation of the sensor fiber and the assignment of the individual cores is achieved by this asymmetric distribution. One may label the core at 12 o'clock as the first, the core at 3 o'clock as the second, and the core at 6 o'clock as the third core, where it is defined that the asymmetry is at 9 o'clock. This asymmetry can be detected easily. The orientation of the sensor fiber in an outer reference system, especially a twist angle, is not specified. Whenever the asymmetry is detected, the individual FBG-cores can be addressed. So the position relative to the reference system can be corrected by simple transformation. The assignment can be carried out in the measurement system. It is important to take note of the correct direction of light throughput.

The asymmetric alignment shown in FIG. 1 can be manufactured easily. The FBG cores are arranged with the desired asymmetry and surrounded with the cladding material. This alignment is kept during the drawing process and therefore results in the asymmetry of the sensor fiber.

Figure 2:
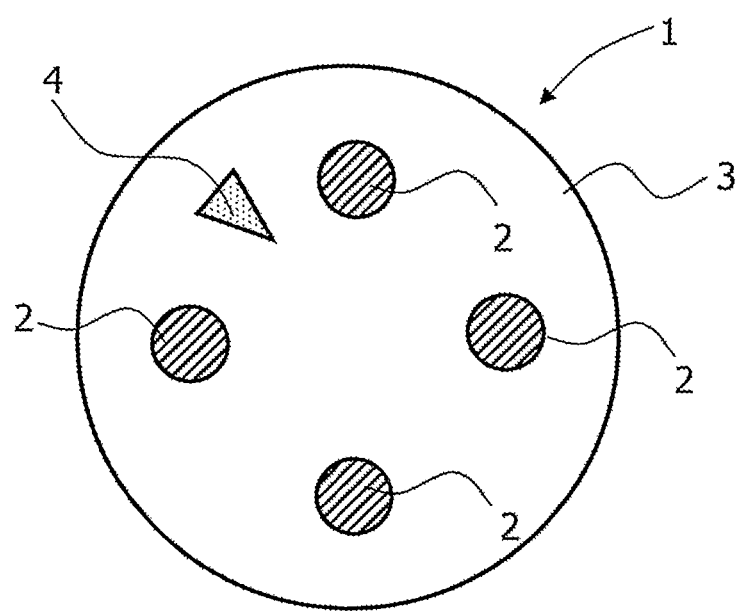
FIG. 2 is a cross-section of a second embodiment of the sensor fiber according to principles of the inventions wherein the sensor fiber includes a marker zone within the cladding.

FIG. 2 shows an embodiment containing four FBG cores in a cylindrical symmetry. In this example, a marker zone 4 is positioned within the cladding 3, the marker zone surrounded by two FBG cores 2. Marker zones are areas in the cladding having different optical properties than the cladding. The embodiment shown in FIG. 2 is a marker zone with a triangular cross-section. It is small compared with the FBG cores, but large enough for a reliable detection.

The marker zones can be built as optical waveguides too, but they are not intended to be the sensor cores. Their object is to deliver an orientation signal as reference point for the complete fiber.

Figure 3:
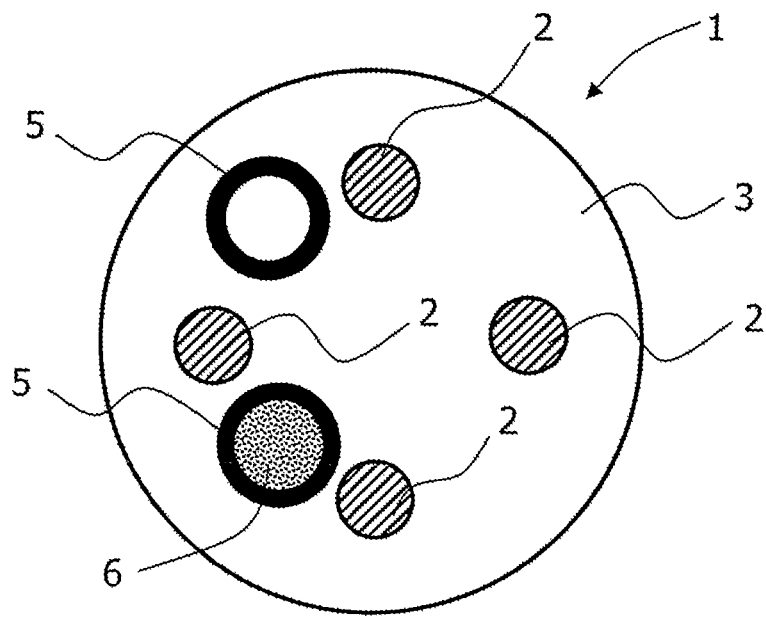
FIG. 3 is a cross-section of a third embodiment of the sensor fiber according to principles of the inventions wherein the sensor fiber includes a marker zone built with a capillary with/without marker and/or analyte.

The implementation of one or more marker zones in the cladding 3 is shown in FIG. 3. Two capillaries 5 are embedded in the cladding where one capillary is filled with an analyte and/or marker 6. This marker can be a fluorescent substance from which fluorescent light is detected by the measurement system. Capillaries are shown in the cross-section as holes, which are either filled or empty. A sensor fiber with such a construction enables the distinction of the individual FBG cores 2 in a way that the first core and the ongoing cores in clockwise direction are labelled and detectable. Counterclockwise labelling is also possible. Further, both capillaries are distinguishable so it is possible to detect the direction of light throughput where the individual cores are always distinguishable. The orientation of the sensor fiber and its individual cores is carried out in a way that a measurement system is able to detect the signals of the capillaries 5 and address the individual FBG cores.

Figure 4:
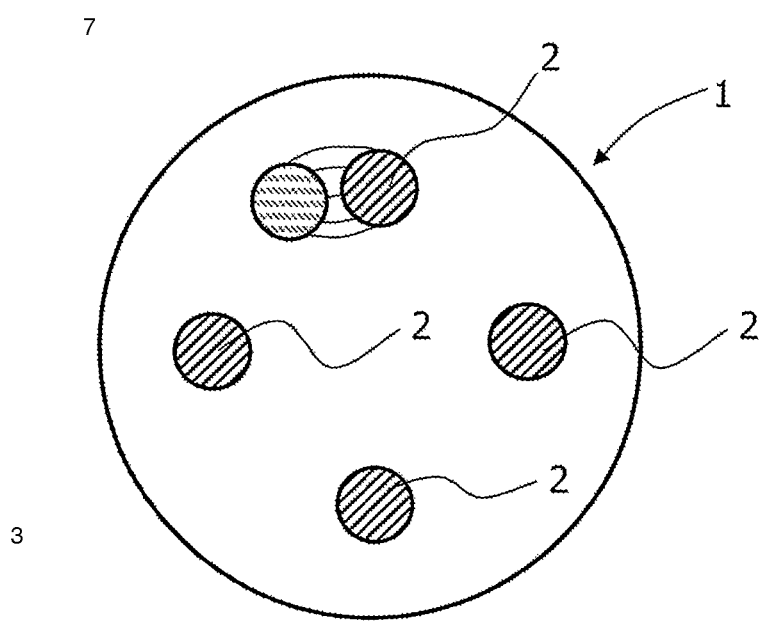
FIG. 4 is a cross-section of a fourth embodiment of the sensor fiber according to principles of the inventions wherein the sensor fiber includes a rod to induce mechanical tension.

Another option for marking and addressing is shown in FIG. 4. Within the cladding 3, a rod 7 is placed which is in proximity to one of the FBG cores 2 and induces mechanical tension within this core. This results in a change of the optical properties of the FBG core. Therefore this core can be detected and used as reference point. From this point the other cores can be labelled.

Figure 5:
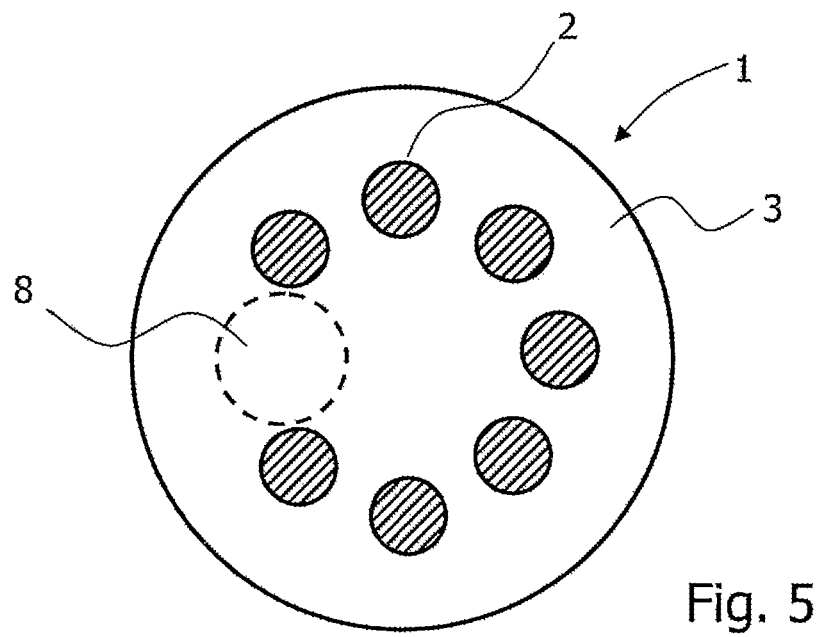
FIG. 5 is a cross-section of a fifth embodiment of the sensor fiber according to principles of the inventions wherein the sensor fiber has a symmetry-disturbing hole.

FIG. 5 shows a further option for addressing the individual FBG cores. The cylindrical symmetric alignment of eight FBG cores 2 within the cladding 3 is carried out. The eightfold symmetry is disturbed by replacing one of the FBG cores by a rod 8. This rod has the refractive index of the cladding and may be produced from the same material. In alternative embodiments, the rod is of a different material or may have refractive index different than that of the cladding. In any case, the symmetry is disturbed and the rod 8 works as reference spot.

Figure 6:
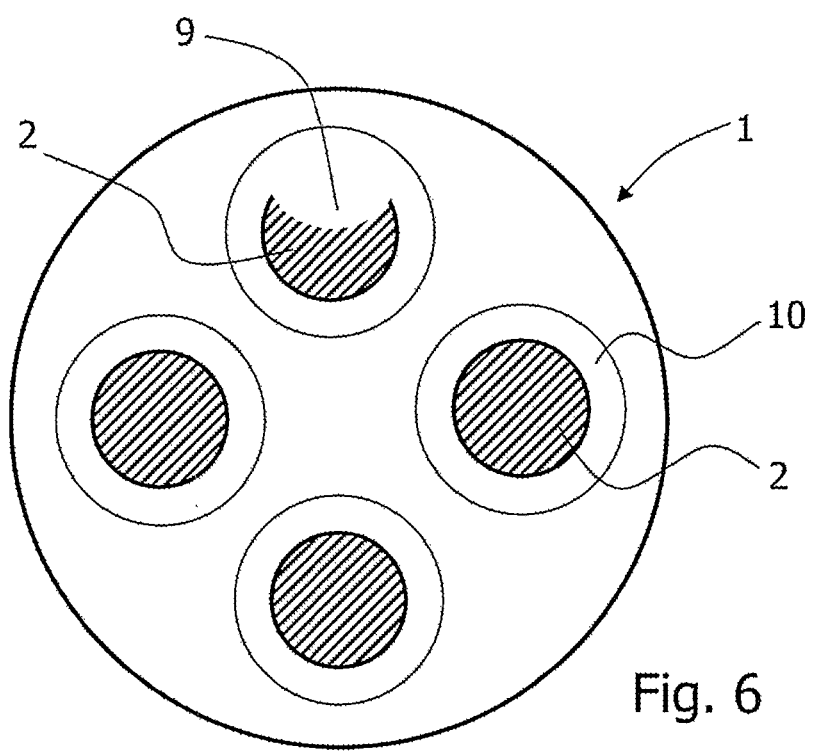
FIG. 6 shows a cross-section of a sixth embodiment of the sensor fiber according to principles of the inventions wherein the sensor fiber has a modified FBG core.

FIG. 6 shows another embodiment of the sensor fiber 1 with four FBG cores 2 within the cladding 3. In this embodiment, one of the cores is modified 9, which makes this core a reference spot. Further, all FBG cores are surrounded with a layer of depressed refractive index material 10. The layer of depressed refractive index material tends to reduce optical cross-talk between the FBG cores. The modification 9 can be achieved by grinding the FBG core to be asymmetric.

Figure 7:
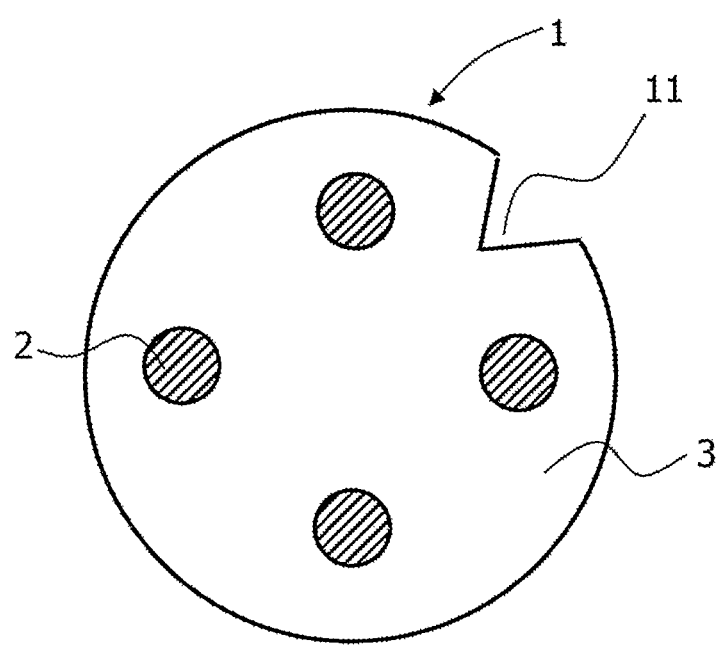
FIG. 7 is a cross-section of a seventh embodiment of the sensor fiber according to principles of the inventions wherein the sensor fiber has a discontinuity in the outer sphere of the fiber.

FIG. 7 shows an embodiment of the sensor fiber 1 with four FBG cores 2 within the cladding 3. The marker zone is an inhomogeneity 11 within the outer surface of the sensor fiber. The inhomogeneity is formed as a groove. The groove can be formed within the sensor fiber by grinding an initial groove in one of the core preforms. The drawing process results in rounding of the initial groove, but the groove is still reliably detectable.

During the manufacturing of the preform and the fiber, the single cores are molten with the surrounding tube. In some cases, the FBG as well as the modifications can be inscribed during the drawing process.

It is to be understood that the above-identified embodiments are simply illustrative of the principles of the invention. Various and other modifications and changes may be made by those skilled in the art which will embody the principles of the invention and fall within the spirit and scope thereof.

We claim:
1. A sensor fiber, comprising:
   a multicore optical waveguide, comprising:
      a fiber Bragg grating structure with at least two fiber Bragg grating cores; and a cladding material surrounding the at least two fiber Bragg grating cores, wherein the fiber Bragg grating structure is configured and arranged such that orientation of the fiber Bragg grating structure and the fiber Bragg grating cores is detectable using a marker zone by which each fiber Bragg grating core is discriminable and can be addressed explicitly, and wherein the marker zone further comprises a mechanical tension-inducing rod wherein the induced tension results in a detectable change in optical properties of a nearby fiber Bragg grating core of the at least two fiber Bragg grating cores.

2. A sensor fiber, comprising:

a multicore optical waveguide, comprising:

a fiber Bragg grating structure with at least two fiber Bragg grating cores; and a cladding material surrounding the at least two fiber Bragg grating cores, wherein the fiber Bragg grating structure is configured and arranged such that orientation of the fiber Bragg grating structure and the fiber Bragg grating cores is detectable, and wherein the fiber Bragg grating structure further includes a detectable marker zone wherein the detectable marker zone further comprises a mechanical tension-inducing rod wherein the induced tension results in a detectable change in optical properties of a nearby fiber Bragg grating core of the at least two fiber Bragg grating cores.

* * * * *